L. E. WATERMAN.
REVOLVING HARROW.
APPLICATION FILED APR. 23, 1908.
967,092.
Patented Aug. 9, 1910.
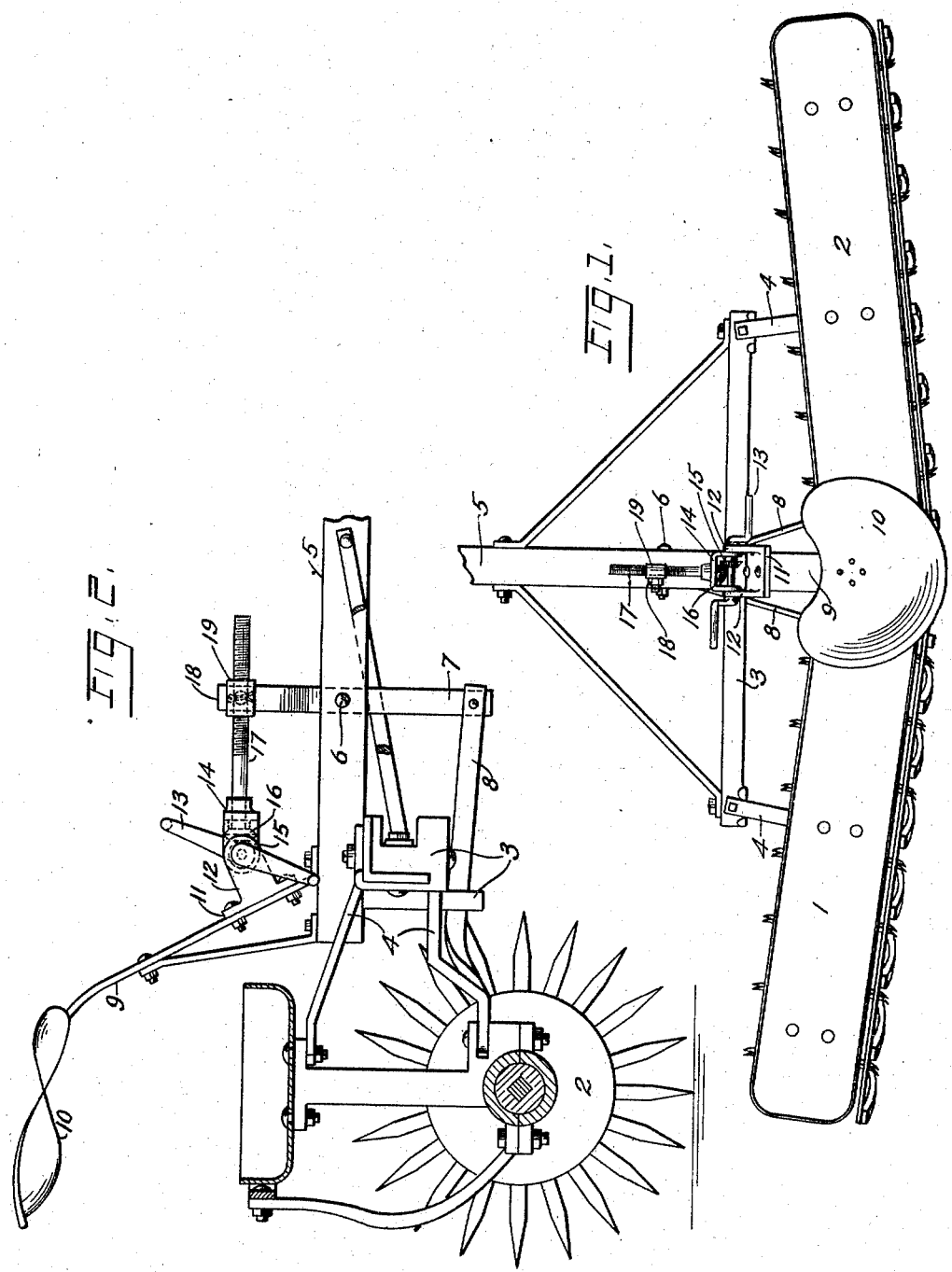
Witnesses:
J. O. Clark
E. Behel.
Inventor:
Lewis E. Waterman,
By A. O. Behel.
Attorney.

UNITED STATES PATENT OFFICE.

LEWIS E. WATERMAN, OF ROCKFORD, ILLINOIS, ASSIGNOR TO EMERSON-BRANTINGHAM CO., OF ROCKFORD, ILLINOIS, A CORPORATION OF ILLINOIS.

REVOLVING HARROW.

967,092.  Specification of Letters Patent.  Patented Aug. 9, 1910.

Application filed April 23, 1908. Serial No. 428,838.

*To all whom it may concern:*

Be it known that I, LEWIS E. WATERMAN, a citizen of the United States, residing at Rockford, in the county of Winnebago and State of Illinois, have invented certain new and useful Improvements in Revolving Harrows, of which the following is a specification.

The object of this invention is to adjust the angularity of the gangs of a revolving harrow by the feet of the driver which will leave the hands of the driver free to manage the team.

In the accompanying drawings, Figure 1 is a plan view of a revolving harrow embodying my improvements. Fig. 2 is a transverse vertical section through one of the sections. The tongue and parts connected therewith are not sectioned.

The harrow in the main is of a well known construction and comprises the sections 1 and 2 connected to the frame 3 by the bars 4 which form a pivotal support for the sections. A tongue 5 is supported by the frame. Through a vertical opening in the tongue is located a lever that is pivoted to the tongue intermediate its ends by the bolt 6. To the lower end 7 of this lever are pivoted the bars 8, which have their other ends connected to the gang sections 1 and 2 in the usual manner. A seat support 9 is secured to the rear end of the tongue 5 and a seat 10 is connected to the support. A bracket 11 is secured to the seat support and has ears 12 projecting forward. A double foot pedal shaft 13 is journaled in the ears 12, and a yoke 14 is pivotally connected with the ears 12 by being journaled on the shaft 13. To the pedal shaft 13 is fixedly connected a bevel-pinion 15, which meshes with a bevel gear 16 fixedly connected to one end of the screw-threaded shaft 17. The end of the shaft 17 to which the bevel gear 16 is connected, is journaled in the yoke 14. To the upper end 18 of the rock-bar is swiveled a threaded-nut 19, through which the screw-threaded portion of the shaft 17 passes.

The driver mounted in the seat 10 can rest his feet on the double foot lever 13, and can rotate the foot lever 13 and through the bevel-gears 15 and 16 will rotate the screw-threaded shaft 17. By rotating the shaft 17 in one direction the rock-lever will be moved on its pivot 6 which will push the bars 8 and force them rearward, thereby angling the gang sections with respect to one another as shown at Fig. 1. By rotating the shaft 17 in the opposite direction the gang sections will be moved in alinement. By the employment of the screw-threaded shaft 17 and its screw-threaded connection with the rock-bar, and the connection between the rock-bar and the gang sections, the gang sections will be positively held at any point of their adjustment without other locking means. This foot lever arrangement forms a simple and efficient means of adjusting the gang sections, and leaves the hands of the driver free to manage the team.

I claim as my invention.

1. The combination with a support, of an earth agitating member adjustably mounted thereon, and means for adjusting said member including a rotary shaft having a lateral movement, a pedal shaft geared thereto and having a pair of oppositely disposed pedals, and mountings for the shafts that permit the lateral movement of said rotary shaft while maintaining the gear connections between the shafts.

2. The combination with a supporting frame, of an earth agitating member adjustably mounted thereon, a lever fulcrumed on the frame and connected with the member, a bracket mounted on the supporting frame, a pedal shaft journaled on the bracket and having oppositely disposed pedals, a swinging yoke pivoted on the pedal shaft, a rotary shaft journaled in the swinging yoke and geared to the pedal shaft, and a nut threaded on the rotary shaft and swiveled on the lever.

In testimony whereof I have hereunto set my hand in presence of two subscribing witnesses.

LEWIS E. WATERMAN.

Witnesses:
A. O. BEHEL,
E. D. E. N. BEHEL.